United States Patent [19]

Weiler et al.

[11] Patent Number: 5,113,978
[45] Date of Patent: May 19, 1992

[54] SPOT TYPE DISC BRAKE

[75] Inventors: Rolf Weiler, Eppstein; Wolfgang Schiel, Frankfurt am Main; Rainer Bretzler, Eppstein, all of Fed. Rep. of Germany

[73] Assignee: Alfred Teves GmbH, Frankfurt am Main, Fed. Rep. of Germany

[21] Appl. No.: 593,364

[22] Filed: Oct. 1, 1990

Related U.S. Application Data

[63] Continuation of Ser. No. 345,150, Mar. 28, 1990, abandoned.

[30] Foreign Application Priority Data

May 7, 1988 [DE] Fed. Rep. of Germany ....... 3815733

[51] Int. Cl.⁵ .............................................. F16D 65/04
[52] U.S. Cl. ............... 188/73.31; 188/73.35; 188/250 B
[58] Field of Search ............. 188/72.4, 73.1, 73.31, 188/73.32, 73.33, 73.34, 73.35, 73.36, 73.37, 73.44, 73.45, 251 B

[56] References Cited

U.S. PATENT DOCUMENTS

| 3,964,581 | 6/1976 | Habgood | 188/73.31 |
|---|---|---|---|
| 3,972,393 | 8/1976 | Courbet et al. | 188/73.31 |
| 4,171,037 | 10/1979 | Souma | 188/73.5 |
| 4,220,223 | 9/1980 | Rinker et al. | 188/250 B |
| 4,296,841 | 10/1981 | Funimori et al. | 188/73.1 |
| 4,360,079 | 4/1982 | Belart | 188/73.36 |
| 4,392,559 | 7/1988 | Oshima | 188/73.32 |
| 4,410,068 | 10/1988 | Schreiner | 188/73.38 |
| 4,410,069 | 10/1988 | Schreiner | 188/73.36 |
| 4,424,886 | 1/1984 | Frigger et al. | 188/73.35 |
| 4,467,898 | 8/1984 | Courbet et al. | 188/73.44 |
| 4,511,019 | 4/1985 | Marianu | 188/73.35 X |
| 4,609,078 | 9/1986 | Bach et al. | 188/73.43 |
| 4,641,730 | 2/1987 | Lombardi et al. | 188/73.45 |

FOREIGN PATENT DOCUMENTS

| 0139890 | 5/1985 | European Pat. Off. | 188/73.31 |
|---|---|---|---|
| 3346478 | 8/1984 | Fed. Rep. of Germany . | |
| 2916244 | 3/1987 | Fed. Rep. of Germany . | |
| 2804808 | 9/1988 | Fed. Rep. of Germany . | |
| 2926818 | 12/1988 | Fed. Rep. of Germany . | |
| 7306074 | 9/1974 | France . | |
| 2114243 | 8/1983 | United Kingdom . | |
| 2147376 | 5/1985 | United Kingdom . | |

Primary Examiner—Matthew C. Graham
Attorney, Agent, or Firm—Robert P. Seitter; J. Gordon Lewis

[57] ABSTRACT

This invention relates to a spot-type disc brake, in particular for automotive vehicles, with a housing straddles a brake disc in a U-shaped manner and has a housing bridge, a first housing leg having a piston-and-cylinder unit, and a second, external housing leg, with a first brake shoe which has a carrier plate and is arranged on the first, piston-side leg, with a second brake shoe which has a carrier plate and is arranged on the second, external housing leg and supports the housing radially relative to the brake disc's axis and with projections on the carrier plate which supports the brake shoe in the radial direction and in the circumferential direction. According to this invention, the projections on the carrier plate of the brake shoe are arranged outside the circumference of the brake disc.

4 Claims, 3 Drawing Sheets

SPOT TYPE DISC BRAKE

This application is a continuation of application Ser. No. 345,150, filed Apr. 28, 1990, now abandoned.

BACKGROUND OF THE INVENTION

This invention relates to a spot-type disc brake for automotive vehicles. The brake includes a U-shaped housing which straddles a brake disc and has a housing bridge. A first housing leg is provided which has a piston-and-cylinder unit. A second, external housing leg, also, is provided having a first brake shoe attached to a carrier plate which is arranged on a first, piston-side leg and having a second brake shoe attached to a carrier plate which is arranged on the second, external leg and supports the housing radially relative to the axis of the brake disc, and with projections on the carrier plate which supports the brake shoe in the radial direction and in the circumferential direction.

German Published Patent Application DE-OS 28 04 808 describes a brake-shoe holding device of a spot-type disc brake for automotive vehicles having two carrying parts which are arranged at a distance with regard to each other in the circumferential direction of the brake disc. A brake shoe is displaceably guided on the carrying parts in the direction of brake application and is connected with the carrying part circumferentially of the brake disc in such a positive manner as to ensure that, at least in case of higher brake application forces, the frictional force ensuing at the brake shoe will be transmitted to both carrying parts. A disadvantage of this floating-caliper spot-type disc brake is found in a brake carrier to be fastened on a steering knuckle and straddling a brake disc in a U-shaped manner.

SUMMARY OF THE INVENTION

It is, therefore, an object of this invention to provide a simplified spot-type disc brake, to reduce the expenditure in terms of material and to ensure a simple mounting of such a spot-type disc brake.

This object is solved in accordance with the present invention wherein the projections on the carrier plates of the brake shoes are arranged outside the circumference of the brake disc. The spot-type disc brake is mounted on an integrated steering knuckle. The steering knuckle has carrying arms which, outside the brake disc's circumference, project over a brake disc to be fastened.

One embodiment of this invention, the projection has an L-shape, with a first leg of the L supported by a first surface in the circumferential direction and with a second leg of the L supported by a second surface in the radial direction. After the spot-type disc brake has been mounted the brake shoe, thus, will abut with its two L-shaped projections on the carrying arms of the integrated steering knuckle which, consequently, upon brake application will transmit the circumferential and radial forces directly onto the rigid parts of the vehicle body.

In another advantageous embodiment of this invention, a groove is provided in the projection. This groove will support the carrier plate in the radial direction and in both circumferential directions. In doing so, a push-pull principle will be realized since, brake application being weak, the circumferential force at first will be distributed to push one of the arms. Subsequently, brake application being strong (thus resulting in an expansion of the carrying arms), the circumferential force will be distributed to pull the other arm of the integrated steering knuckle.

Advantageously, the projection has a canted surface so as to give the brake shoe the possibility of moving between pad carrier and steering knuckle in order to eliminate corrosion problems. Upon any braking operation, the brake shoe will slide radially along the canted surface and in the direction of rotation of the brake disc outwardly so that the brake shoe will shake itself free of any corrosion or corrosive particles.

Advantageously, the brake shoes are identical. Thus, storage will be reduced since both the piston-side pad and the external pad are identical.

Springs are arranged on the brake shoes in order to hold the brake pads on the housing. The piston-side brake shoe on the piston-side housing leg is held by a spring engaging a recess, preferably an annularly surrounding groove of the piston. The external brake shoe is held by a spring on the external housing leg. By fastening the brake shoes to the housing, a simple mounting will advantageously be ensured since the spot-type disc brake which essentially consists of the housing and the brake shoes can be placed as an assembly unit onto the integrated steering knuckle over the already installed brake disc. Integrated construction means that the brake carrier and the steering knuckle are combined into an integral steering knuckle. Advantageously, the two springs are identical. Thus, limited storage will be possible in this respect, too.

BRIEF DESCRIPTION OF THE DRAWING

In the following, further advantageous features of this invention will be revealed by the following description of the inventive spot-type disc brakes, with reference to the accompanying drawing. In the drawing.

DETAILED DESCRIPTION

Figure 1:
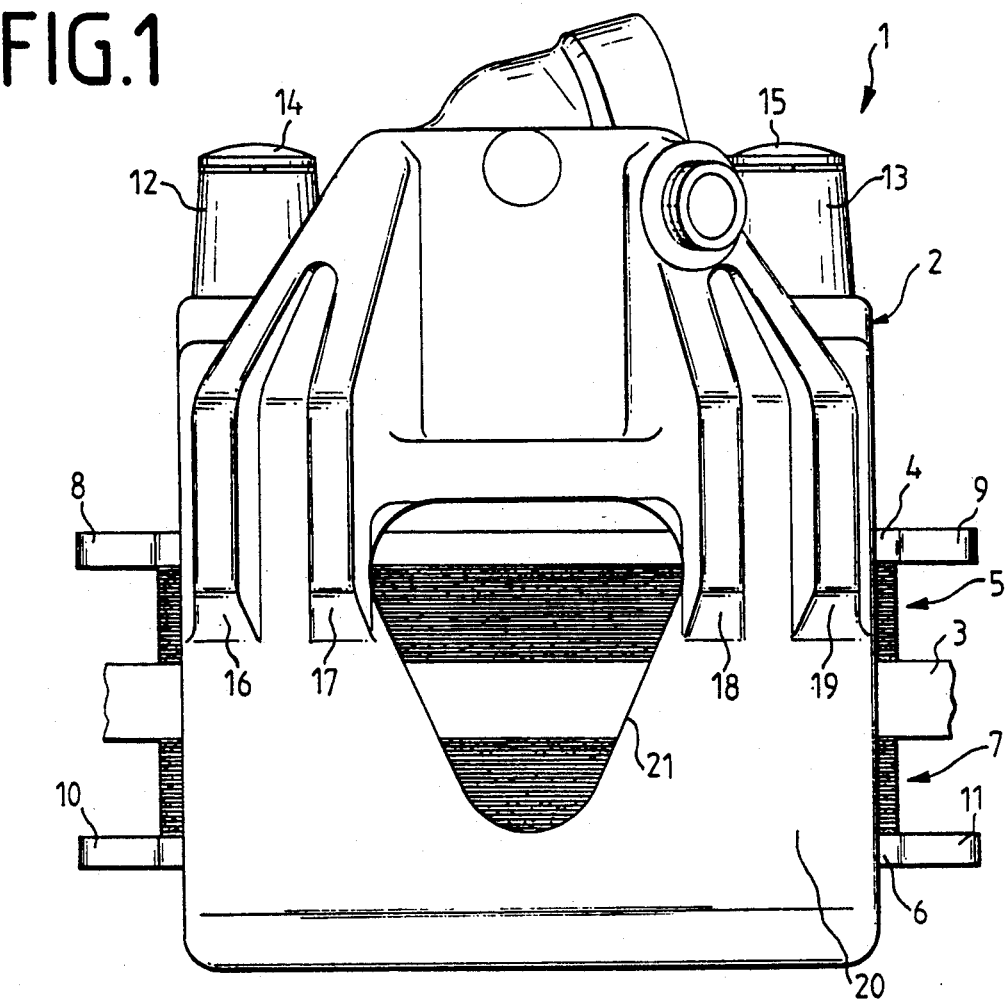
FIG. 1 is a top plan view of a spot-type disc brake in accordance with the present invention having three-point support.

FIG. 1 shows a floating-caliper spot-type disc brake 1 for automotive vehicles having an essentially U-shaped housing 2 which straddles a brake disc 3 and having a first brake shoe 5 attached to a carrier plate 4 and a second brake shoe 7 attached to a second carrier plate 6. The carrier plate 6 of the brake shoe 7 has two projections 8, 9 which are offset on the distal ends in the circumferential direction and which are arranged in a direction radially outward of the brake disc's axis. The second, external brake shoe 7 has like projections 10, 11 on its carrier plate 6. Spring elements 12, 13 (also called bushings) having locking caps 14, 15 are provided for fastening the spot-type disc brake 1 to the steering knuckle. The housing 2 has reinforcing ribs 16–19 extending in an essentially axial direction. A housing bridge 20 has an aperture 21.

Figure 2:
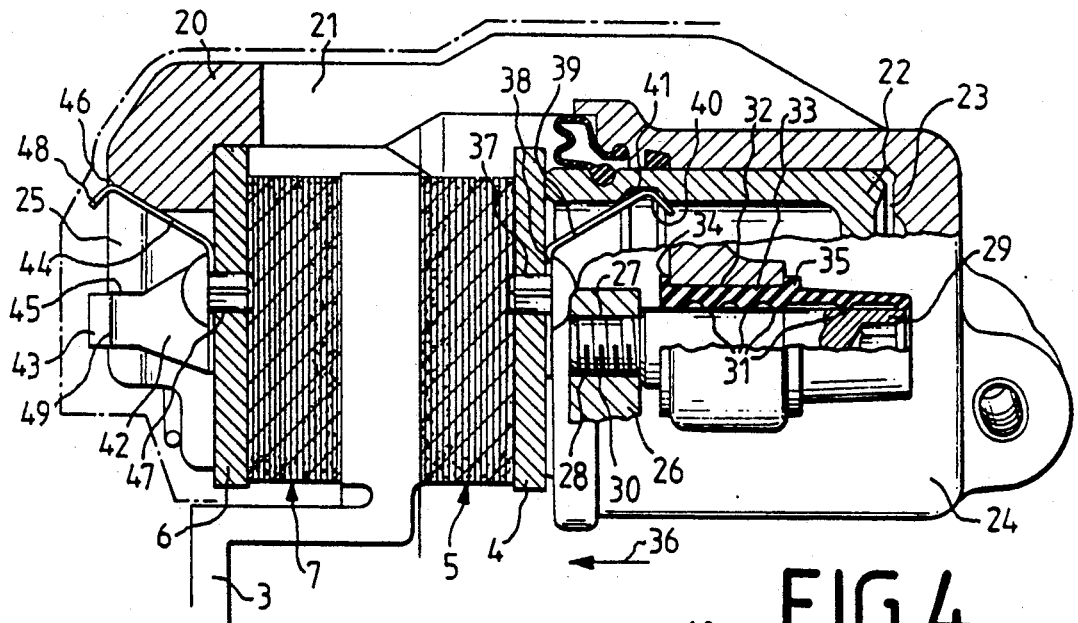
FIG. 2 is a section of a side view of the spot-type disc brake of FIG. 1.

FIG. 2 illustrates the spot-type disc brake 1 with the U-shaped housing 2 which straddles the brake disc 3 and has the housing bridge 20. A first housing leg 24 is provided having a piston-and-cylinder unit 22, 23 consisting of piston 22 and of cylinder 23. A further external housing leg 25 also is provided. Brake shoe 5 is arranged on the piston-side leg 24 and brake shoe 7 is arranged on the external leg 25. Instead of a brake carrier an integrated steering knuckle 26 is provided which rigidly and stationarily is fastened to the vehicle body. The steering knuckle 26 has a bore 27 with a thread 28 into which a bolt 29 with a thread 30 is screwed. The bolt 29 is inserted into cylindrical bushing 12 abutting with annularly shaped ribs 31 on the surface of the bolt. The bushing 12 is passed through a bore 32 of the housing 2 and rests with its outside cylindrical surface area 33 on the inside wall of said bore 32. Projections 34, 35 prevent the bushing from slipping out of this bore 32. Upon brake application, a hydraulic medium, hereinafter referred to as brake fluid, will be pumped into the cylinder 23 so that the piston 22 will be moved in direction 36. In this action, the brake shoe 5 will be moved against the brake disc 3 and the brake shoe 7 will be pressed against the other side of the brake disc via a reaction force. Upon brake application the housing 2 will be slide with the bushing 12 on the bolt 29. A rivet 37 riveted into the carrier plate 4 attached to the brake shoe 5 holds a spring 38 with three spring arms 39 (only one spring arm 39 being visible in the drawing) which, through a bent spring arm section 40, engages an annularly surrounding groove 41 of the piston 22. A further spring 42 engages grooves 45, 46 by means of its three spring arms 43, 44 (only two of the spring arms being visible in the drawing) and secures the external brake shoe 7 on the external housing leg 25. The spring 42 is fastened to the carrier plate 6 attached to the brake shoe 7 by means of a rivet 47.

Advantageously, the carrier plates 4, 6 for brake shoes 5, 7 as well as the springs 38, 42 and the means of fastening 37, 47 the springs 38, 42 to the carrier plates 4, 6 of the brake shoe 5, 7 are identical to reducing storage requirements.

Figure 3:
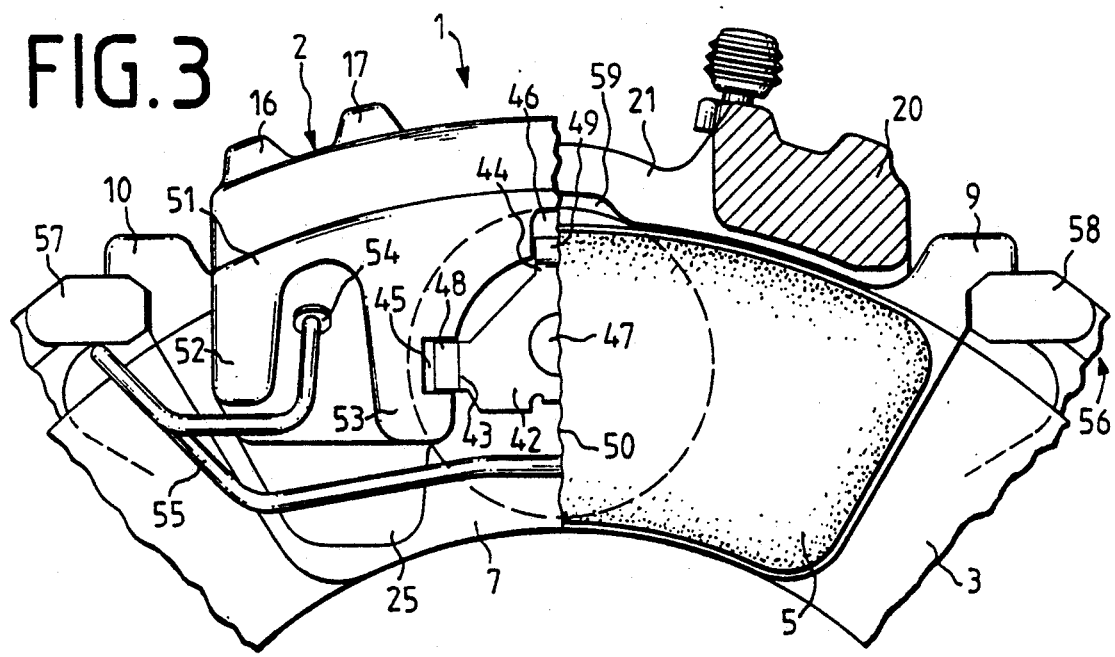
FIG. 3 is a partial section of another side view of the spot-type disc brake of FIG. 1.

FIG. 3 shows the spot-type disc brake with a partial section of the housing 2 which straddles the brake disc 3, with the brake shoes 5, 7, the reinforcing ribs 16, 17, the aperture 21 and the external housing leg 25. The triangular spring 42 is symmetrical to a radial intersection line 50. The spring has two spring arms 43 perpendicularly extending away from the intersection line 50 (of said two spring arms only one spring arm 43 is visible in the drawing). The arm 44 extends parallel to intersection line 50. The spring arms 43, 44 project with their bent spring arm sections 48, 49 into the three grooves of which only grooves 45, 46 can be seen in the drawing due to the sectional representation. The housing leg 25 has a reinforcing rib 51, which extends in the circumferential direction, and four ribs seamlessly fitted thereto and extending in a radial direction (only two ribs 52, 53 are visible in the drawing due to the sectional representation). The housing leg 25 of the housing 2 has two openings (only opening 54 being visible in the drawing) into which a wire spring 55 projects. Said spring bracing the housing 2 to an integrated steering knuckle 56 at the latter's carrying arms 57, 58. The integrated steering knuckle 56 is rigidly and stationarily arranged on the vehicle body. The two brake shoes 5, 7 are supported with their projections 8, 9 on carrier plate 4 and 10, 11 on carrier plate 6 being supported on the carrying arms 57, 58. The brake shoe 5 has a crescent-shaped projection 59 projecting into the aperture 21 of the housing bridge 20 in the housing 2.

Figure 4:
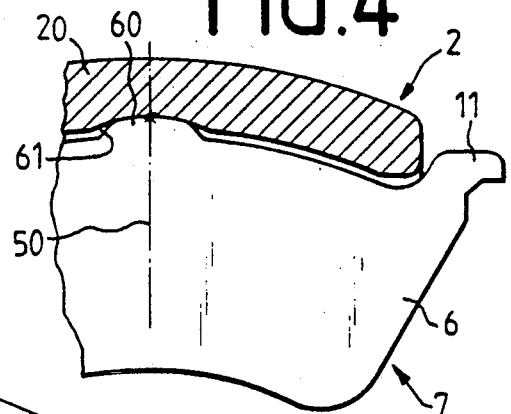
FIG. 4 shows one point of the three-point support between the housing and the brake shoe of the disc brake illustrated in FIG. 1.

FIG. 4 shows a third supporting point of the caliper housing 2 via the external brake shoe 7 on the integrated steering knuckle 56. The first two supporting points of the housing 2 are the two bolts 29 arranged symmetrical to the intersection line 50. Centrally in respect to the circumferential direction and radially outwardly, the carrier plate 6 has a crescent-shaped projection 60 which projects into a suitable recess 61 in the housing bridge 20. The spring 55 braces the housing 2 on the steering knuckle 56 via the housing's recess 61, the projection 60 and via the projections 10 and 11. As the projection 60 and the recess 61 are arranged centrally the caliper is supported by means of a three-point support.

Figure 5:
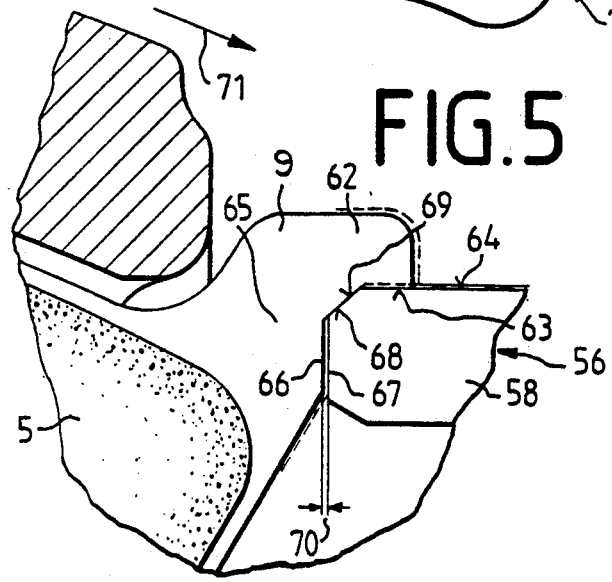
FIG. 5 shows a canted surface between the brake shoe and the integrated steering knuckle of the disc brake illustrated in FIG. 1.

FIG. 5 shows the support of the brake shoe 5 on the carrying arm 58 of the integrated steering knuckle 56 via the projection 9. The projection 9 is essentially L-shaped, with a first leg 62 being supporting with its surface 63 on the surface 64 of the carrying arm 58 in an essentially radial direction. The second leg 65 is supported with its surface 66 on a surface 67 of the carrying arm 58 in an essentially circumferential direction. The surfaces 63 and 64 are arranged perpendicular to the surfaces 66, 67. A canted surface 68 extends between said surfaces 63 and 67 of the carrying arm 58, said surface 68 cooperating with a canted surface 69 between the surfaces 64 and 66 of the projection 9. An area of play 70 between the surfaces 66 of the brake shoe 5 and 67 of the carrying arm 58 will be overcome upon brake application so that the brake shoe 5 with its canted surface 69 will slide up on the carrying arm 58, thus adopting the end position illustrated in FIG. 5 by a broken line. By virtue of this "sliding-up," corrosion problems will be overcome. In this embodiment, the brake disc 3 rotates in a direction of rotation 71. Advantageously, the brake shoes 5 and 7 are identical and the projections B, 9, 10 and 11 display a mirror symmetry to intersection line 50.

Figure 6:
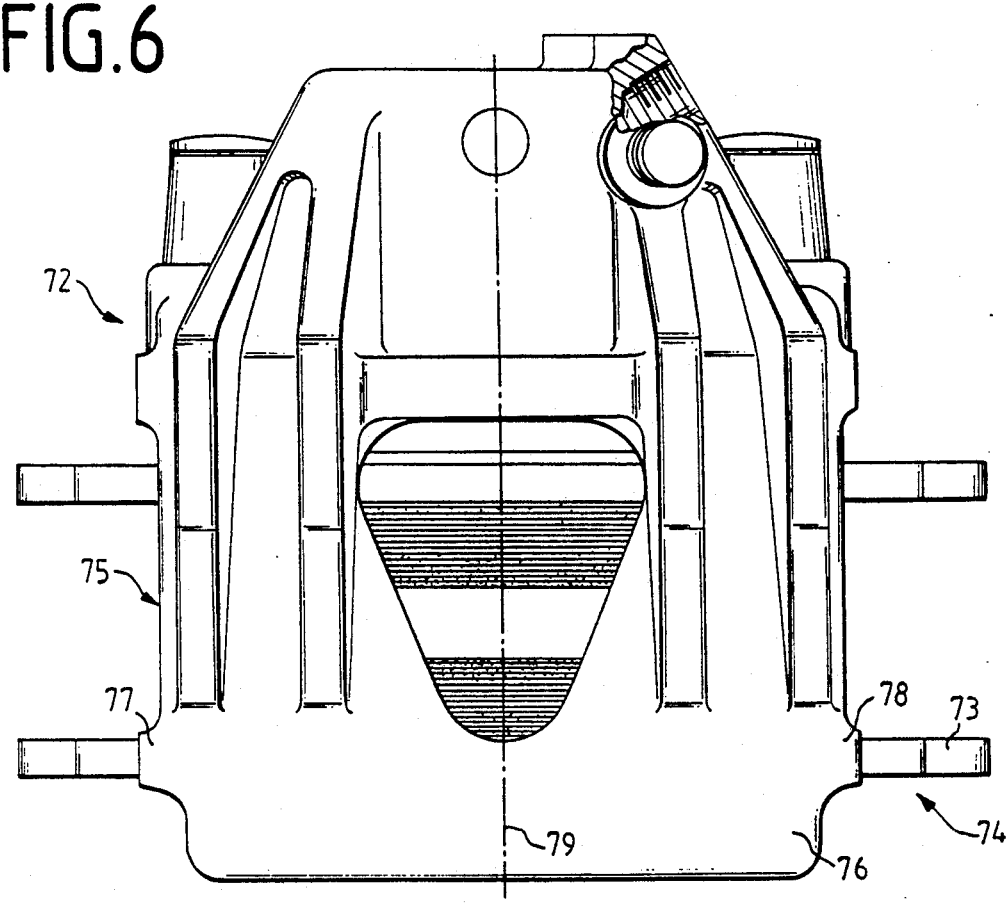
FIG. 6 the top plan view of another embodiment of the spot-type disc brakes of invention having a four-point support.

FIG. 6 shows another embodiment of a floating-caliper spot-type disc brake 72 which is supported by means of a four-point support via a carrier plate 73 of an external brake shoe 74 via two supporting points. To this end, the housing 75 has two projections 77 and 78 on the level of housing leg 76.

Figure 7:
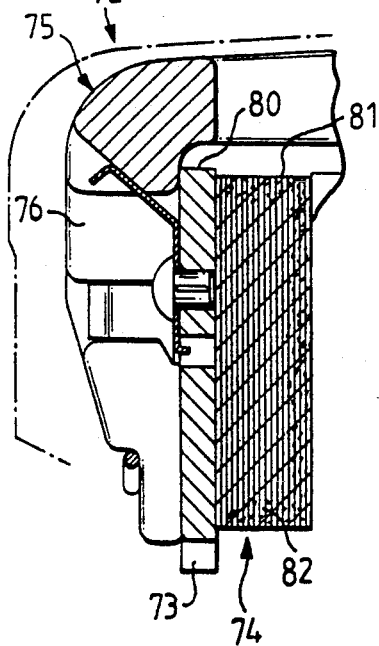
FIG. 7 is a section of a side view of the spot-type disc brake of FIG. 6.

FIG. 7 shows the spot-type disc brake 72 with the housing 75 and the housing leg 76. The carrier plate 73 of the brake shoe 74 has an upper radially outer surface 80 which, on the level of intersection line 79 (FIG. 6), ends substantially flush with the upper radially outer surface 81 of a friction pad 82 of the brake shoe 74.

Figure 8:
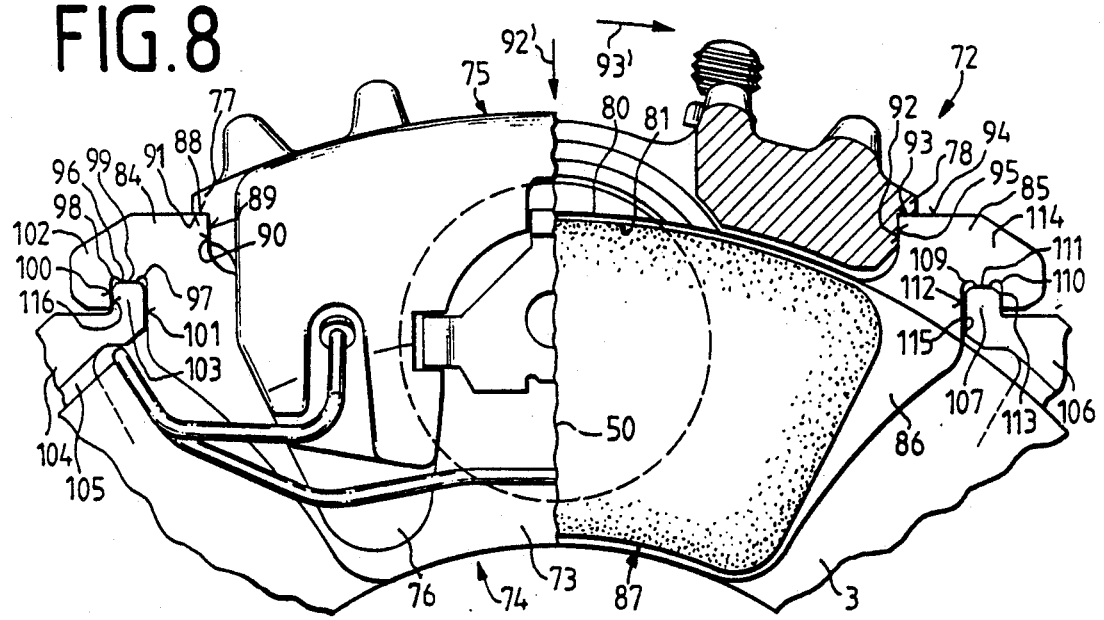
FIG. 8 is a partial section of another side view of the spot-type disc brake of FIG. 6.

FIG. 8 shows the spot-type disc brake 72 with the housing 75 and the housing leg 76. By means of a two-point support, the housing 75 is supported via projections 77 and 78 on projections 84 of the carrier plate 73 of the brake shoe 74. To this end, the housing 75 has two surfaces 88, 89 arranged approximately perpendicular to one another. The surfaces 88, 89 are supported on surfaces 90, 91 of the projection 84 in both a radial direction 92 and a circumferential direction 93; surfaces 90, 91 being perpendicular with respect to one another. On the opposite side which is offset in the circumferential direction, the projection 78 has surfaces 92, 93 supported on surfaces (not illustrated due to the sectional representation) of the brake shoe 74 (not illustrated in this area). The (non-illustrated) surfaces of the brake shoe 74 (not illustrated in this part of the drawing) correspond to surfaces 94 and 95 of the projection 85 of the piston-side brake shoe 87. The projection 84 of the external brake shoe 74 has a groove 96 with rounded cavities 97, 98 on the groove bottom 99. The groove further has surfaces 100 and 101. Groove 96 forms a hook 102 embracing a rectangular projection 103. The rectangular projection 103 is part of a carrying arm 104 of an integrated steering knuckle 105. On the opposite side which is offset in the circumferential direction, the integrated steering knuckle 105 projects with its carrying arm 106 and the radially outwardly pointing projection 107 into a groove 108 with rounded cavities 109, 110 on the groove bottom ends of a groove bottom 111. A hook 114 reaches over projection 107. Further, the groove has surfaces 113 and 114 arranged perpendicularly to the groove bottom. Upon brake application and upon rotation of the brake disc 3 in the direction 93, the surface 112 of the groove at first will be caused to abut on a surface 115 of the projection 107 so that the carrying arm 106 will take up the circumferential force. Upon a stronger brake application, surface 100 of groove 96 on the opposite side of the brake shoe will be applied to a surface 116 of the carrying arm 104 (push-pull principle). The radially outer surfaces 80, 81 of the brake pad and of the carrier plate extend in the circumferential direction 93 on approximately the same level.

What is claimed is:

1. A spot-type disc brake for an automotive vehicle having a rotatable brake disc, and a steering knuckle member fixed relative said rotation of said brake disc having a pair of circumferentially spaced apart axially extending arms, said disc brake comprising a U-shaped housing having a pair of legs which straddle said brake disc in a U-shaped manner and are connected by a housing bridge, said pair of housing legs including a first housing leg having a piston-and-cylinder unit including a piston mounted in a cylinder, and a second, external housing leg, a first brake shoe which has a first carrier plate engaging said first, piston-side leg, a second brake shoe which has a second carrier plate engaged by said second, external leg, and with at least two projections oppositely disposed on each side of said first and second carrier plates which support the associated first or second brake shoe in the radial direction and in the circumferential direction, said projections on the carrier plate of each brake shoe being arranged for engaging and being supported by said axially extending arms of said fixed steering knuckle member, means establishing engagement of each of said carrier plates projections with a respective one of said steering knuckle member arms, each of said carrier plate projections including a first radially extending surface, a second projection surface extending circumferentially away from said first, radially extending surface, and a third projection surface circumferentially spaced away from said first projection surface extending radially inwardly from said second projection surface to form a radially inwardly facing groove on either side of said first and second carrier plates so that either end of each of said carrier plates is of hook shape;

said means establishing engagement of each of said steering knuckle arms with a respective projection on each side of said first and second carrier plates comprising a first radially extending arm surface formed on an axially extending portion of each of said arms, juxtaposed and facing said first projection surface of a respective side of each of said first and second carrier plate projections, and a second radially extending surface formed on said axially extending portion of each of said steering knuckle arms circumferentially spaced from said first surface, and facing said second projection surface of a respective side of each of said first and second carrier plates, said steering knuckle arm portions thereby each fit into a respective groove formed on each side of said first and second carrier plates, whereby circumferential braking reaction forces may be transmitted form each of said carrier plates into both of said steering knuckle arm portions by pushing of one of said steering knuckle arm portions by said projection of one side of each of said first and second carrier plates acting through mating of said first projection surface against said arm portion first surface, and by pulling of the other of said steering knuckle arm portions by the other of said projections of said first and second carrier plates acting through mating of said second projection surface of each of said first and second surface.

2. The spot-type disc brake according to claim 1 wherein each of said arms of said steering knuckle member are formed integrally therewith.

3. The spot-type disc brake according to claim 2 wherein each of said grooves formed on said carrier plates and each of said steering knuckle arms axially extending portion fit into a respective groove all lie outside the perimeter of said brake disc, whereby an integrated steering knuckle member allows removal of said brake shoes and housing.

4. The spot-type disc brake according to claim 1 wherein each end of said first and second carrier plates engage mating surfaces formed respectively on said first and second housing legs.

* * * * *